April 28, 1970     W. J. BERLEYOUNG ET AL     3,508,986
METHOD OF SONICALLY WELDED CHANNEL PLATES
Filed April 5, 1967     2 Sheets—Sheet 1
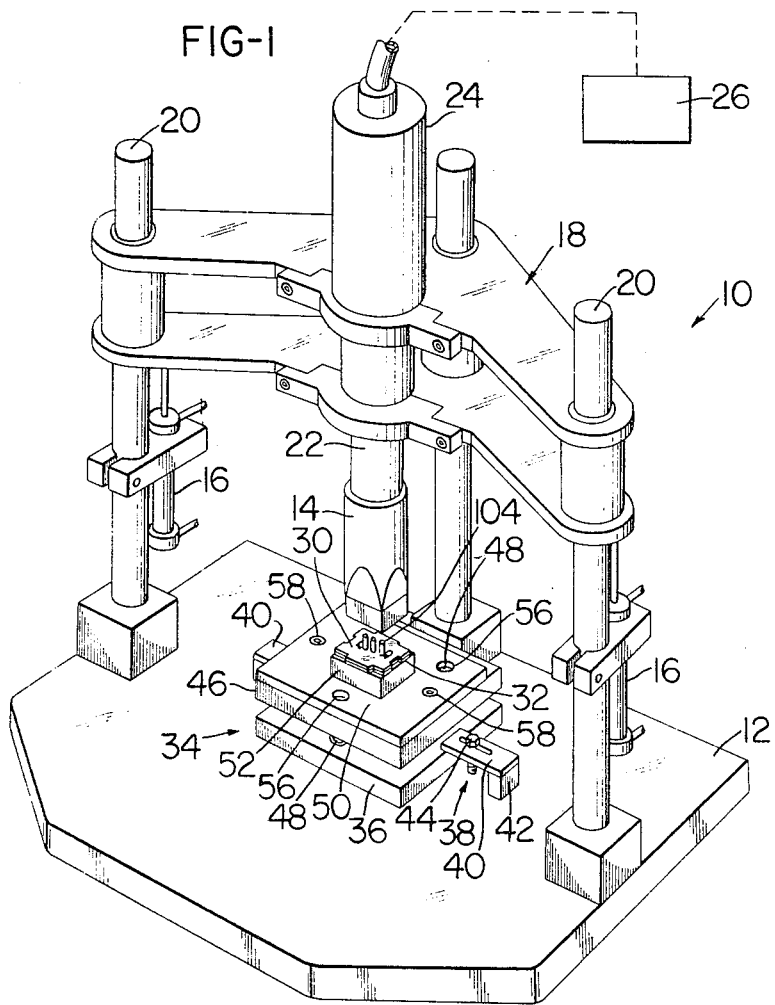
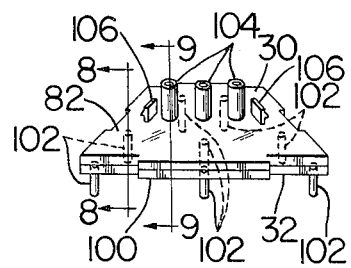
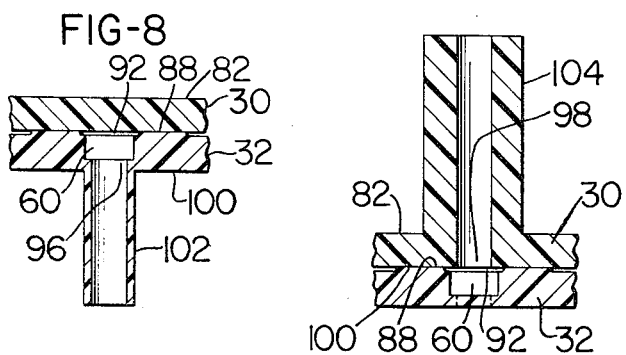
INVENTORS
WALTER J. BERLEYOUNG
KENNETH G. KREUTER
BY KLAUS P. MUELLER
THEIR ATTORNEYS

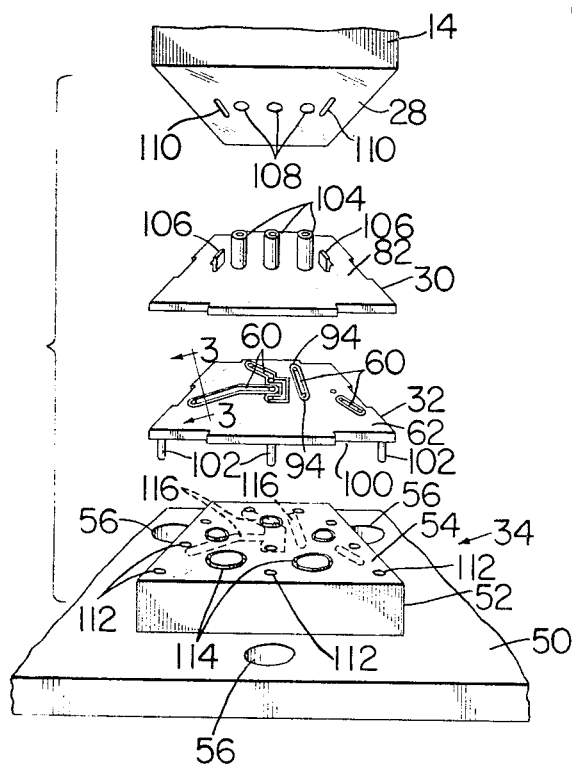
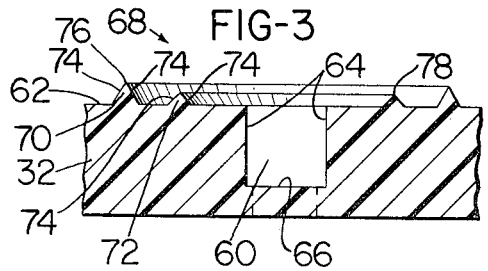
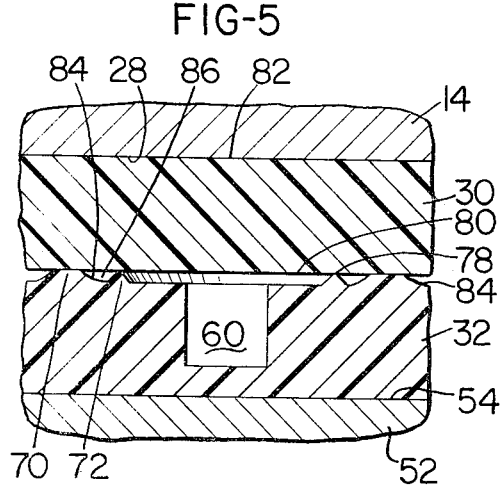
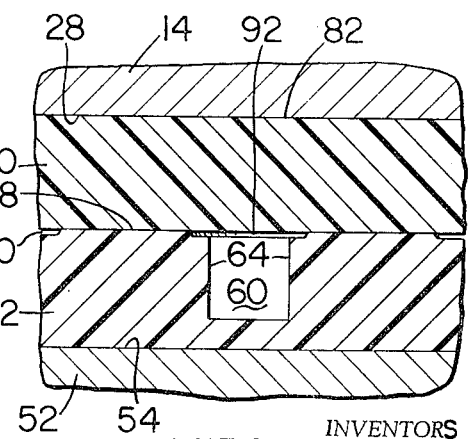

United States Patent Office 3,508,986
Patented Apr. 28, 1970

3,508,986
METHOD OF SONICALLY WELDED CHANNEL PLATES
Walter J. Berleyoung, Kenneth G. Kreuter, and Klaus P. Mueller, Goshen, Ind., assignors to Robertshaw Controls Company, Richmond, Va., a corporation of Delaware
Filed Apr. 5, 1967, Ser. No. 628,700
Int. Cl. B29c 27/08; B32b 31/16
U.S. Cl. 156—73                                    15 Claims

ABSTRACT OF THE DISCLOSURE

This application discloses a method of sonically welding a channel between one of a pair of thermoplastic plates. Ridge means are placed along the sides of the channel. The crests of the ridge means provide a relatively small frictional area which is to be sonically welded adjacent the sides of the channel. The ridge means includes an outer ridge and an inner ridge along the sides of the channel with the outer ridge being higher than the inner ridge. Openings may be provided in either of the plates or both of the plates, which openings are connected with the channel, so that fluid may be circulated into or out of the channel through either or both of the plates. A tube or tubes may be connected with the openings in the plates for guiding the fluid into or out of the channel.

---

This invention relates to sonically welded channel plates.

A pair of thermoplastic plates may be sonically welded together by providing a channel in one of the plates, and providing ridge means along both sides of the channel on either of the plates. The plates are then placed adjacent each other and are sonically frictionally welded by sonically frictionally producing melted material from the ridge means between the plates and thereafter solidifying and welding said melted material against adjacent surfaces of the plates on each side of the channel to produce a sealing weld construction, a sealing band between the plates adjacent to and on each side of the channel.

Either or both of the plates may be provided with openings connected to the channel and extending through the plates or either of the plates. If desired, tubes may be provided at the outer end of the openings on either or both of the plates to guide fluid into or out of the channel.

The ridge means may include an outer and higher ridge and an inner lower ridge adjacent each side of the panel.

The ends of the channel may be sealed by uniting the ridges, and the band produced thereby, around the ends of the channel to form a completely sealed channel construction between the plates.

Other features of this invention are apparent from this description, the appended claimed subject matter, and/or the accompanying drawings in which:

FIGURE 1 is a diagrammatic perspective view showing an apparatus for sonically welding the plates.

FIGURE 2 is an exploded perspective view showing the plates to be welded separated from each other and between the horn and die plate of the apparatus.

FIGURE 3 is an enlarged cross section of one of the plates along the line 3—3 of FIGURE 2.

FIGURE 4 is a view similar to FIGURE 3 and showing the plate of FIGURE 3 with an upper plate resting on the plate of FIGURE 3, and both of such plates resting on the die plate as shown in FIGURE 1.

FIGURE 5 shows the plates of FIGURE 4 pushed together by the sonic horn until the flat surface of the upper plate has contacted the lower inner ridge crest to continue to press the plates together to produce the flat weld band of FIGURE 6.

FIGURE 7 is a perspective view showing a complete pair of welded panels, after removal from the welding apparatus of FIGURES 1 and 2.

FIGURE 8 is an enlarged cross section taken along the line 8—8 of FIGURE 7.

FIGURE 9 is an enlarged cross section taken along the line 9—9 of FIGURE 7.

Certain words may be used in this specification and in the claimed subject matter indicating direction, relative position, and the like. These words are used for the sake of clearness and brevity and are intended to be applied only to the direction, relative position, and the like, as applied to the views in the drawings. However, it is to be understood that in actual practice, the parts so described may have entirely different direction, relative position, and the like. Examples of these words are "upper," "lower," "vertical," "horizontal," etc.

The words "sonic" and "ultrasonic" and derivatives thereof, are intended to be used interchangeably to describe vibrations of a character suitable for performing the welding operation of this invention. For example, the frequencies may have a range of from 4,000 to 20,000 vibrations per second.

An apparatus suitable for performing the welding operation of this invention is diagrammatically indicated at 10, FIGURE 1. The main parts of this apparatus may be purchased on the market and are merchandised, for example, by Branson Instruments Incorporated, having a place of business at Danbury, Connecticut.

Such apparatus may include a pedestal or base 12 which supports a sonic welding horn 14, so that such horn may be vertically moved by suitable hydraulic or pneumatic cylinders 16 which raise and lower a supporting platform construction 18 on posts 20. The platform 18 carries a horn supporting shaft 22, a sonic power unit 24 connected to a power supply unit 26.

The horn 14 is provided with a large contact area under surface 28 which is adapted to engage a large area of the upper plate 30 when the horn 14 is lowered into sonic welding position. The pair of plates 30 and 32 are placed together on top of the welding support platform 34, and the horn is then brought into welding engagement with the top of the plate 30 and sonic vibrations are produced in the horn 14 to produce the sonic welding operations to be described.

The lower surface 28 of the horn is tailored by the supplier at the request of the user to provide the under surface 28 with substantially absolute perpendicularity to the support shaft 22. The platform 34 is of any suitable construction that can be adjusted to have absolute parallelism with the under surface 28 of the horn 14.

For example, the platform 34 may include a lower plate 36 that is secured to the pedestal 12 by bracket securing means 38. Such means may include, for example, a flat bar 40, at each end of the plate 36, which rests on the plate 36 and on a block 42, which rests on pedestal 12. The bar 40 is bolted down by a bolt or screw 44, that is tapped into the pedestal 12 firmly to secure the plate 36 on the platform 12. An upper plate 46 is adjustably secured to the plate 36 by three screw constructions 48 that are tapped into the plate 36, pass upwardly through plate 46, and have head constructions countersunk at the top of plate 46. The screws 48 may have suitable lock nut constructions, not shown, so that the plate 46 may be adjusted by such screw constructions so that the die plate 50, and its raised block die 52 may be adjusted to have die block face 54 substantially absolutely parallel with the under surface 28 of the horn 14. The screw constructions 48 may be adjusted through the three aligned openings 56 in the die plate 50. The die plate 50 may be secured to the upper plate 46 by two screw constructions 58, which pass through plate 50 and have head constructions, which may be countersunk, and bear down on the die plate 50 and are tapped into the upper plate 46.

The plates 30 and 32 to be sonically welded to each other may be placed on the block face 54, FIGURES 1 and 2. Then the horn 14 is lowered to cause under surface 28 to have a large area contact with plate 30 and to force plate 30 on to plate 32 and both plates on to block 52. Sonic vibrations are imparted to the plate 30 to produce a sonic weld between the plates.

For example, the plate 32, which is to be sonically welded to the plate 30, may be provided with one or more fluid conductive channels 60 extending down from the upper surface 62 of the plate 32. The channel 60 may have sides or edges 64 adjacent the surface 62, which sides or edges 64 extend down to the bottom 66 of the channel 60.

The plates 30 and 32 may be made of thermoplastic material suitable for the sonic welding operations herein described. Such thermoplastic material may be readily selected by any one skilled in the art. For example, the plates 30 and 32 may be injection molded, in suitable molds, of Du Pont Lexan plastic, or any of many similar plastic materials available on the market and readily selected by those skilled in the art.

Sonically to weld the plates together, the plate 32 may be provided with ridge means or sealing weld band producing means 68 on the plate upper surface 62 adjacent the sides 64 of the channel 60. Such ridge means may include two pairs of ridges 70 and 72 on each side 64 of the channel 60. Each of such pairs of ridges may include an outer ridge 70 and a lower inner ridge 72.

Each of the ridges 70 and 72 may have equilateral sides 74 which may have a cross section that forms an equilateral angle. For example, the ridge 70 may form an equilateral angle in the order of 60°, more or less. The lower ridge 72 may have an equilateral angle in the order of 90°, more or less.

The ridges 70 and 72 may have crests 76 and 78 which are serially engaged by the lower flat surface 80 of the upper plate 30 during the sonic welding operation diagrammatically indicated in FIGURES 3–6.

The plate 30 is placed on the plate 32 in engagement with the higher ridge 76 and out of engagement with the lower ridge 78, as shown in FIGURE 4, with the plate 32 resting on the die block 52, as shown in FIGURE 1. Thereafter the horn 14 is lowered, by the cylinders 16, so that a large area of under surface 28 of the horn 14 engages a large area of the upper surface 82 of the plate 30, as diagrammatically indicated in FIGURE 5. The flat surfaces 28 and 82 are relatively large, so that the sonic vibrations of the horn 14 cannot generate any welding heat between the surfaces 28 and 82. However, the crests 76 and 78, of the ridges 70 and 72, have relatively small surfaces which come into engagement with the flat surface 80 of the plate 30. The sonic vibrations which are transferred to the plate 30 by the horn 14 are carried to the small areas of the ridge crests 76 and 78 while they come into contact with the flat surface 80 of the plate 32. This produces a sonic melting action of the thermoplastic material at such crests and down the ridges. As shown in FIGURE 5, the crest of the ridge 70 has been melted by the frictional heat generated between the crest 76 and the flat surface 80 and flows to produce melted material 84 which has a wetting action which extends along the flat surface 62 of the plate 32 between the ridges 70 and 72.

As the horn 14 and the plate 30 are further lowered from the position of FIGURE 5, an additional frictional heat is produced in the crest 78 of the ridge 72, to produce additional melted material which tends to flow into the space 86 between the ridges 70 and 72, FIGURE 5, because of the attraction of the first formed melted material 84. The melted material 84 has an attractive force for the melted material which is formed from the ridge 72, with the result that a sealing weld construction or band 88 is produced between the plates 30 and 32 adjacent to and on each side 64 of the channel 60. This sealing weld construction or band 88 is solidified as the sonic welding action is stopped, or is rendered ineffective by the width of the band 88, so that the band 88 solidifies and welds the plates 30 and 32 together at such band 88. The sonic weld of the ridges causes the plates 30 and 32 to have a slight unwelded space or separation 90 on the outside of the band 88, and also to have a similar unwelded space 92 between the weld 88 and the edge 64, which prevents any substantial amount of molten material from flowing into the channel 60 to render such channel 60 undesirably blocked or restricted for the proper flow of fluid through the channel 60.

If desired, the sonic welding action heretofore described, between the plates 30 and 32, may also be produced at either or both ends 94 of any of the channel or channels 60, FIGURE 2. The construction is such that a U-shaped band, similar to band 88, is continued around the ends 94 of the channel 60, completely to seal the interior of the channel 60 from the unwelded space 90 between such plates 30 and 32.

If desired, fluid conductive openings 96 through plate 32, and connected to or extending from channel 60 may be formed, as shown in FIGURE 8. Also, if desired, fluid conductive openings 98 through plate 30 may be formed, which are connected to and extend from the channel 60. That is, one or more openings 96 may be formed in and through the plate 32 connected to and extending from the channel 60, and one or more openings 98 may be formed in and through the plate 30, which are also connected to and extend from the channel 60. These openings 96 and 98 may terminate at the surface 100 of plate 32, or surface 82, of the plate 30.

The construction is such that fluid may be introduced into, or removed from, the channel 60 through any one or more of such openings 96 and/or 98.

Additionally, any one or more of the openings 96 and/or 98 may be connected respectively with the tubes 102 and 104, so that such fluid may be introduced into, or removed from, the channel 60 through such tubes 102 and/or 104. Such tubes 102 and/or 104 may be molded homogeneously to the plates 30 and 32. Alternatively, such tubes may be made separately, and secured to the plates 30 and 32, by a welding action, an adhesive action, and the like.

The plates 30 and 32 may have protrusions on their faces 82 and 100, which protrusions, such as tubes 102 and 104, and others such as hooks 106, etc., FIGURES 2 and 7 which could engage the flat surfaces 28 and 54 of the horn 14 and die block 54, unless suitable cavities or indentations 108, 110, 112 and 114, FIGURE 2, are provided in such surfaces 28 and 54 to receive such protrusions without interfering with the flat surface contact of such surfaces 28 and 54 to produce a proper sonic welding action such as herein described.

Additionally, if desired, slight protrusions 116 may be produced on the face 54 of the die block 52, which correspond more or less with the channel constructions of plate 32 in such a manner as to concentrate the frictional sonic action being produced between the plates 30 and 32 to the ridge constructions of the channel 60, and thereby produce a more effective sonic welding action.

This is desirable, since an effective sonic welding action is satisfactorily achieved only when relatively large surfaces 28 and 82 are provided between the horn 14, and the plate 30, and a concentrated relatively large surface engagement is provided at the flat slight protrusions 116 on the plate face 54.

By way of example, the following sizes are given for satisfactory welds, in plates 30 and 32, which may have the following dimensions:

The plates 30 and 32 may have mainly flat opposed inner and outer surfaces and may be of any desired size, such as in the order of 2 inches wide along the edges. The channels 60 may be relatively long and narrow, and may be in the order of .031 inch wide and .031 inch deep, more or less. The outer higher ridges 70 may be from .006 to .008 inch high, more or less, and .120 inch between the two higher ridges 70, more or less. The inner lower ridges 72 may be from .004 to .006 inch high, more or less, and may be .082 inch between the two lower ridges 72. The thickness of the plates 30, 32 may be as proportionately shown with respect to the depth of the channel 60 or they may be of any other proper width, as desired. For example, the depth of the channels may be approximately three-fourths or over one-half of the thickness of the plates in which said channels are formed, as shown in FIGURES 3–6, 8, and 9 of the drawings.

It is thus to be seen that an effective method of forming a sealed fluid conductive channel between a pair of thermoplastic plates has been provided and an improved plate construction with channel constructions between the plates of such plate constructions has also been provided.

While the form of the invention now preferred has been disclosed, as required by statute, other forms may be used, all coming within the scope of the claimed subject matter of this application.

What is claimed is:

1. A method of forming a sealed fluid conductive channel between a pair of thermoplastic first and second plates which comprises providing said first plate with a fluid conductive channel on a first surface of said first plate and with sealing weld band producing means on one of said plates that is outboard of and completely surrounds said channel, providing a fluid conductive opening to extend from said channel to the outside of said plates, placing said plates adjacent each other, and sonically frictionally producing melted material from said band producing means between said plates and thereafter solidifying and welding said melted material against adjacent surfaces of said plates completely around said channel to hold said plates together and produce a sealing weld band between said plates adjacent to and completely around said channel.

2. A method according to claim 1 in which said sealing weld band producing means includes two pairs of ridges respectively on said first plate and completely surrounding said channel.

3. A method of forming a sealed fluid conductive channel between a pair of thermoplastic first and second plates which comprises providing said first plate with a fluid conductive channel on a first surface of said first plate and with sealing weld band producing means on one of said plates on each side of said chanel, providing a fluid conductive opening to extend from said channel to the outside of said plates, placing said plates adjacent each other, and sonically frictionally producing melted material from said band producing means between said plates and thereafter solidifying and welding said melted material against adjacent surfaces of said plates on each side of said channel to produce a sealing weld band between said plates adjacent to and one each side of said channel, said sealing weld band producing means including two pairs of ridges respectively on said first plate on each side of said channel, each of said pairs of ridges including an outer ridge that is higher than the inner ridge of said pair of ridges.

4. A method according to claim 3 in which said outer ridge is in the order of a 60° ridge and in which said inner ridge is in the order of 90° ridge.

5. A method according to claim 1 in which one of said plates is provided with an opening passing through said plates with one end of said opening connected to said channel.

6. A method according to claim 5 in which the other of said plates is provided with an opening passing through said other plate with one end of said last named opening connected to said channel.

7. A method according to claim 5 in which the other end of said opening is connected to a tubular means secured to and extending from said one of said plates.

8. A method according to claim 6 in which the other end of the opening in the other of said plates is connected to a tubular means secured to and extending from said other of said plates.

9. A method according to claim 1 in which a plurality of channels similar to said fluid conductive channel are formed between said plates.

10. A method according to claim 1 in which substantial flow of melted material into said channel is prevented by sufficient spacing of said sealing weld band producing means from said channel.

11. A method according to claim 1 in which at least another channel similar to said first named channel is formed in at least one of said plates.

12. A method according to claim 11 in which a plurality of said channels are formed relatively long and relatively narrow and closed at both ends.

13. A method according to claim 12 in which each of said channels is formed with at least one opening through one of said plates.

14. A method according to claim 13 in which each of said channels is formed with a depth more than one-half the thickness of the plate in which each of said channels is formed.

15. A method according to claim 13 in which said plates are formed with mainly flat opposed inner surfaces and in the order of two inches wide along the edges and with a thickness in the order of .041 inch more or less and in which said channels are formed with a depth and thickness of .031 inch, more or less.

References Cited

UNITED STATES PATENTS

| | | | |
|---|---|---|---|
| 3,224,916 | 12/1965 | Soloff et al. | 156—73 |
| 3,284,257 | 11/1966 | Soloff et al. | 156—73 |

FOREIGN PATENTS

| | | |
|---|---|---|
| 1,257,895 | 2/1961 | France. |

OTHER REFERENCES

Machine Design Magazine, Mar. 16, 1967 issue, article: Designing Plastic Parts for Ultrasonic Assembly.

How To Get Good Ultrasonic Welds, Modern Plastics, November 1964.

DOUGLAS J. DRUMMON, Primary Examiner

U.S. Cl. X.R.

228—1